United States Patent [19]

Lippman

[11] Patent Number: 5,624,511
[45] Date of Patent: Apr. 29, 1997

[54] METHOD AND APPARATUS FOR JOINING HEAT SEALABLE MATERIAL

[75] Inventor: Glenn W. Lippman, 12150 Race St. Unit L-104, Northglenn, Colo. 80241

[73] Assignees: Glenn W. Lippman, North Glenn, Colo.; Gerald Lippman, Boca Raton, Fla.; Thomas T. Yanari, Boulder, Colo.

[21] Appl. No.: 331,033

[22] Filed: Oct. 27, 1994

[51] Int. Cl.$^6$ .................................................... B32B 31/00
[52] U.S. Cl. ........................ 156/64; 156/157; 156/380.9; 156/499; 156/574; 156/579
[58] Field of Search ................................. 156/157, 359, 156/380.9, 497, 499, 574, 579, 64

[56] References Cited

U.S. PATENT DOCUMENTS

| | | |
|---|---|---|
| 2,250,602 | 7/1941 | Pierce. |
| 2,484,566 | 10/1949 | Hiller. |
| 2,814,710 | 11/1957 | Schuetze. |
| 2,960,592 | 11/1960 | Pierce. |
| 3,408,242 | 10/1968 | Rochla. |
| 4,146,419 | 3/1979 | Neidhart. |
| 4,204,904 | 5/1980 | Tabor .................... 156/497 |
| 4,238,665 | 12/1980 | Tremarco. |
| 4,239,581 | 12/1980 | Lang ...................... 156/497 |
| 4,313,780 | 2/1982 | Ford, Jr. ................ 156/579 X |
| 4,354,893 | 10/1982 | Kugler et al.. |
| 4,440,588 | 4/1984 | Stevenson et al.. |
| 4,447,288 | 5/1984 | Seaman. |
| 4,460,433 | 7/1984 | Boyd. |
| 4,504,352 | 3/1985 | Meyer. |
| 4,533,423 | 8/1985 | Johnson et al.. |
| 4,642,155 | 2/1987 | Ramsey. |
| 4,695,335 | 9/1987 | Lyall. |
| 4,725,328 | 2/1988 | Arnold ................... 156/380.9 |
| 4,737,213 | 4/1988 | Paeglis et al. .......... 156/157 |
| 4,743,332 | 5/1988 | Black. |
| 4,744,855 | 5/1988 | Ellenberger. |
| 4,747,903 | 5/1988 | Miller. |
| 4,806,194 | 2/1989 | Wald. |
| 4,834,828 | 5/1989 | Murphy .................. 156/359 |
| 4,855,004 | 8/1989 | Chitjian ................. 156/359 |
| 4,872,941 | 10/1989 | Lippman et al.. |
| 4,894,112 | 1/1990 | Lippman. |
| 4,913,772 | 4/1990 | Taylor et al.. |
| 4,923,559 | 5/1990 | Kennedy et al. ....... 156/579 X |
| 5,290,390 | 3/1994 | Roman et al. ......... 156/579 X |

Primary Examiner—David A. Simmons
Assistant Examiner—Paul M. Rivard
Attorney, Agent, or Firm—Brian D. Smith, P.C.

[57] ABSTRACT

Apparatus and a method for welding overlapping edge sections of heat sealable materials are disclosed. The apparatus generally includes a frame, a heating body attached to the frame for being positioned between the overlapping sheets to heat the sheets, an alignment control mechanism for urging the overlapping sheet into a desired alignment relative to the overlapped sheet and a pressure roller for pressing the heated sections together to weld them together.

25 Claims, 2 Drawing Sheets

METHOD AND APPARATUS FOR JOINING HEAT SEALABLE MATERIAL

TECHNICAL FIELD

The invention relates generally to method and apparatus for joining sheets of heat sealable material and, more particularly, to method and apparatus for maintaining heat sealable sheets in alignment with each other as they are joined.

BACKGROUND OF THE INVENTION

Pliable sheets of heat sealable materials are commonly used in many industrial, environmental and civil construction applications. For instance, a heat sealable sheet is utilized as a roofing membrane to prevent leakage of water through a roof. Heat sealable sheets are also used as pond and landfill liners to contain hazardous waste and to prevent the waste from seeping into the ground. Porous thermoplastic materials such as woven and nonwoven textiles are used for soil erosion control and for lateral filtration in waste management. Typically, in such applications, large sheets of heat sealable materials are placed on the surface to be covered i.e. pond bottom or roof etc., with their edges overlapping. The overlapping edges are then joined by either sewing them together or seam-welding or tack-welding them to each other along or within the overlap.

If the selected process for joining the sheets is a seam or tack welding process, an artisan first separates the overlapping edges and then heats the opposing surfaces of the separated edges by either directing hot air between the separated edges with a blowing hot air device or by heating the opposing surfaces with a heated wedge or platen. When heated sufficiently, the overlapping edges are pressed together to provide a seam or tack-weld between the overlapping sheets which joins the sheets together when it cools.

The above mentioned sewing and hot air methods are very time-consuming and, therefore, expensive. The aforementioned heated wedge or platen method is much quicker and, thus, less costly than the other methods. However, this method also has a drawback in that movement of the wedge between and along the overlapping edges tends to cause the overlapping edges to laterally separate, i.e. spread away from each other such that their edges move out of parallel alignment with each other. As will be appreciated, this not only makes it difficult to maintain a uniform weld but also increases the time required to complete a weld because to keep the edges aligned, the artisan has to occasionally stop welding and manually realign the overlapping edges.

DISCLOSURE OF THE INVENTION

The present invention addresses the aforementioned concerns by providing method and apparatus for seam welding sheets of heat sealable material together which helps to maintain the sheets in alignment with each other as they are welded together, thereby decreasing the time required to weld the sheets together.

The apparatus of the present invention generally includes a frame for supporting and facilitating propulsion of the apparatus. In addition, the apparatus includes a heating body, alignment control means, and pressure means, all of which are preferably attached to the frame. The heating body also referred to as a heating wedge herein is provided to heat the overlapping materials when it is positioned between the overlapping materials and moved relative thereto.

The alignment control means helps to control the position of the section of heat sealable material which has a tendency to move laterally and away from the heating body as the apparatus and sections move relative to each other. In a preferred embodiment, the alignment control means comprises a wheel which contacts and urges the overlapping edge section of heat sealable material to move in a direction which enables an operator of the apparatus to maintain the edges of the overlapping edge sections substantially parallel to each other.

The pressure means preferably includes at least one pressure roller for pressing the overlapping sections together after they have been heated so that they are welded together.

The present invention also provides a method for joining overlapping sheets of heat sealable material (also referred to herein as overlying and underlying sheets) which utilizes the apparatus of the present invention. The method includes the steps of positioning the heating body of the apparatus between the overlying and underlying sections of heat sealable material and heating the overlying and underlying sections with the heating body as the apparatus and sections move relative to each other. In addition, the method includes a step of controlling the alignment of the overlying and underlying sections of heat sealable sheet material as the apparatus and the sections move relative to each other and heat the sections. In the preferred embodiment, alignment of the sections is controlled by maintaining the position of the section of heat sealable sheet material which has a tendency to move laterally as the apparatus and sections move relative to each other. The final step of the method includes pressing the heated sections together to weld them together.

BRIEF DESCRIPTION OF THE DRAWINGS

The invention will be more readily understood by reference to the accompanying drawings wherein like reference numerals indicate like elements throughout the drawing figures, and in which.

BEST MODE FOR CARRYING OUT THE INVENTION

Figure 1:
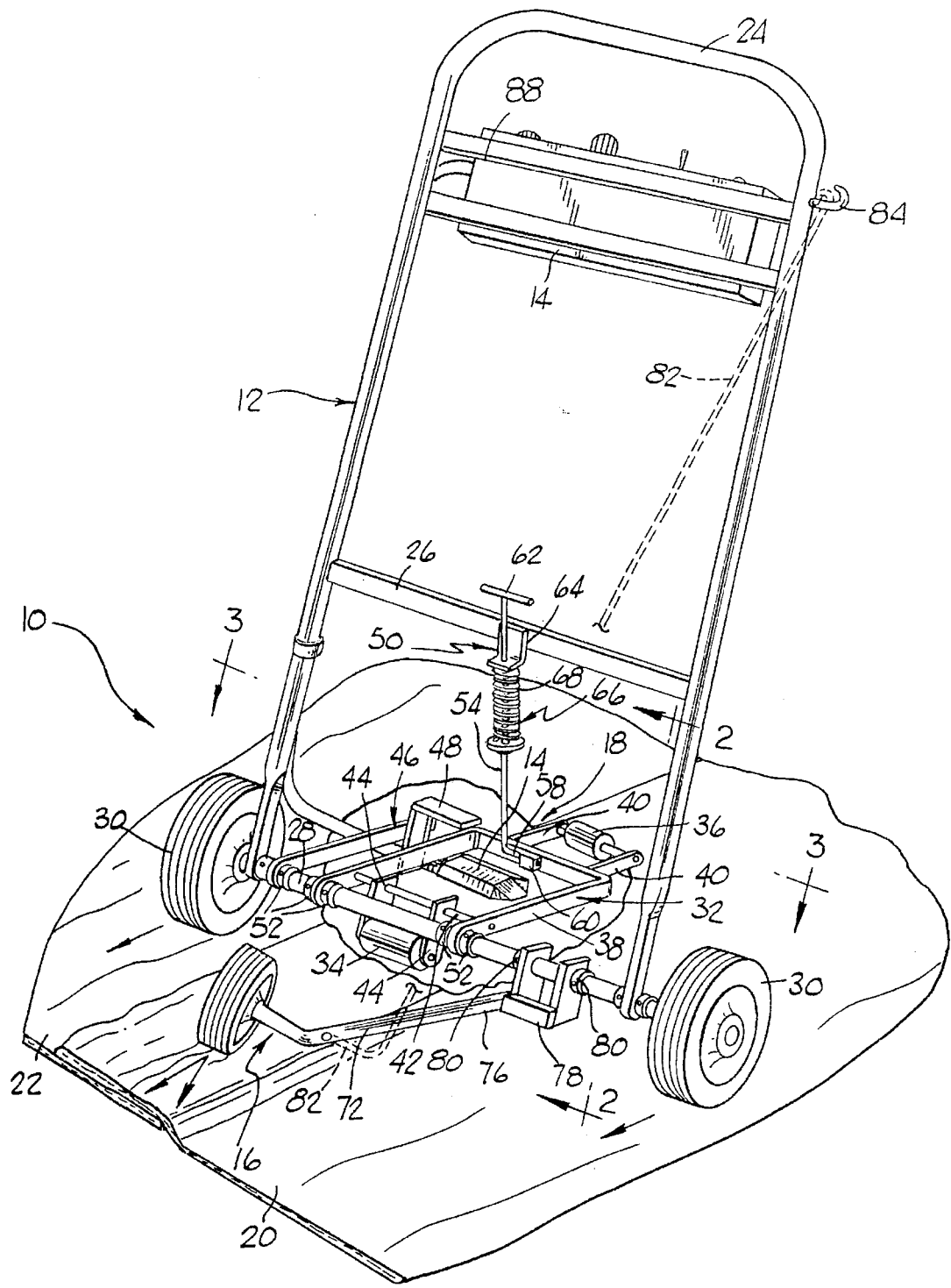
FIG. 1 is a perspective view of an embodiment of an apparatus of the present invention.
Figure 2:
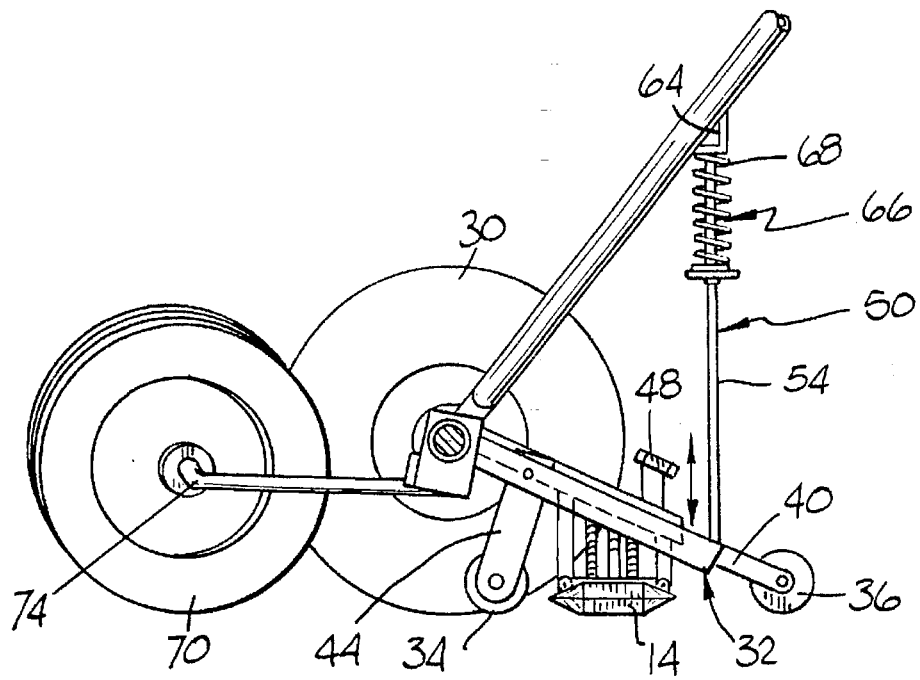
FIG. 2 is a cross-sectional view taken along lines 2—2 of FIG. 1.
Figure 3:
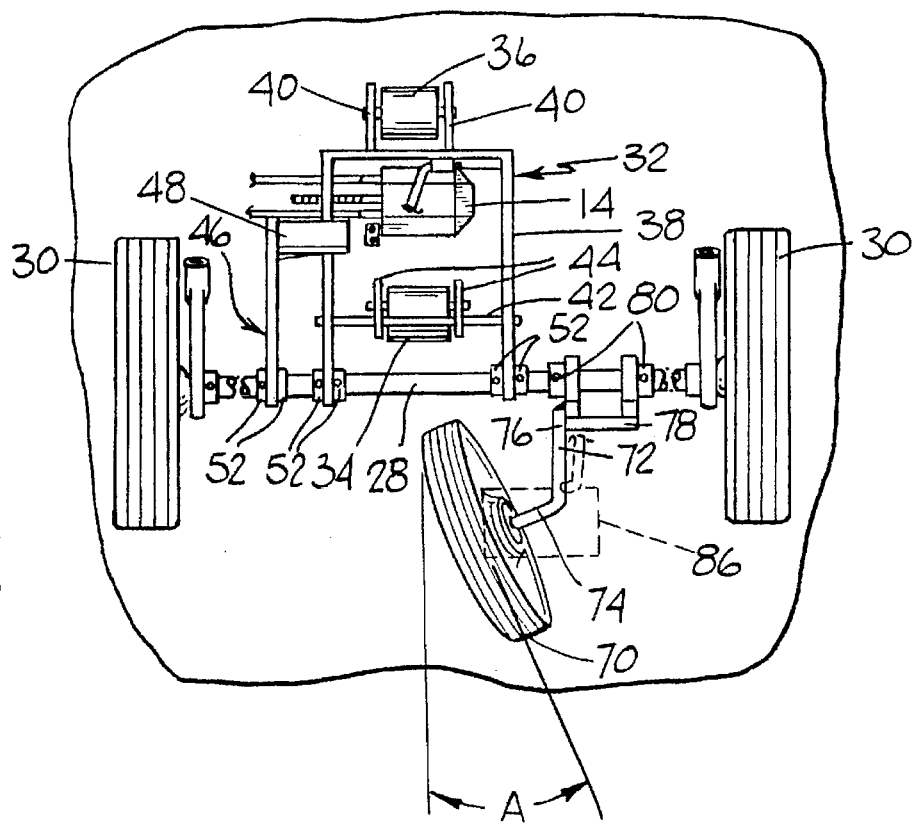
FIG. 3 is a cross-sectional view taken along lines 3—3 of FIG. 1.

FIGS. 1 through 3 illustrate an apparatus 10 of the present invention for welding overlapping edge sections of heat sealable materials. Apparatus 10 generally includes a frame 12, a heating body 14 attached to the frame for being positioned between overlapping sheets 20, 22 to heat the sheets, alignment control means 16 for urging the overlapping sheet into a desired alignment relative to the overlapped sheet and pressure means 18 for pressing the heated sections together to weld them together.

Although not shown in the figures, the present invention in a broad sense can be employed to weld an overlying section of material to an underlying section regardless of the sections' positions relative to one another, as distinguished from the preferred embodiment in which the edge sections of the materials are welded to form a seam of uniform width along its length.

FIG. 1 illustrates apparatus 10 in its operating position in which overlapping sheet section 20 is being welded to overlapped sheet section 22. In general, frame 12 includes a handle 24 which enables the operator to hold and move apparatus 10. Frame 12 also includes a horizontal cross support 26 which is rigidly attached to frame 12, giving the apparatus lateral support. The open free end of frame 12 has an axle 28 positioned therebetween and wheels 30 attached to the ends of axle 28 for facilitating propulsion of apparatus 10.

Frame 12 also includes a pivotable first sub-frame assembly 32 attached to axle 28 which supports a guide roller 34 and pressure roller 36. Guide roller 34 ensures that the overlapping edge section 20 is guided over heating body 14 and pressure roller 36 ensures that the overlapping sections are pressed together after heating so that they are welded together.

Sub-assembly 32 includes a U-shaped bar 38 with a pair of spaced, parallel support extensions 40 attached to the closed end of the U-shaped bar and projecting outwardly therefrom for housing and supporting pressure roller 36. Sub-assembly 32 also includes a cross support axle 42 extending between the free ends of U-shaped bar 38 with a pair of extension bars 44, each of which is pivotally attached at one end to cross support axle 42. The opposite ends of bars 44 axially support guide roller 34. Extension bars 44 pivot about the cross support axle 42 to allow guide roller 34 to be swung upwardly to a raised position which facilitates loading of the overlapping sections 20, 22 into apparatus 10.

Frame 12 also includes a pivotable second sub-frame assembly 46 supporting heating body 14. Second sub-frame 46 is pivotally attached to axle 28 and includes a bracket 48 (or means) for engaging first sub-assembly 32 as sub-assembly 32 is lifted into its loading position by a lift arm means 50 attached to sub-assembly 32, which facilitates positioning of heating body 14 between overlapping sections 20, 22 and positioning of guide roller 34 and pressure roller 36 on the exposed surface of the overlapping sheet section 20. Both the first sub-assembly 32, and the second sub-assembly 46 have collar means 52 at their axle attachment points which prevent the sub-assemblies from sliding laterally on axle 28.

Lift arm means 50 attached to the first sub-assembly 32 includes a rod 54 having a first lower end 58 which is pivotally attached to the closed end of the U-shaped bar 38 of first sub-assembly 32 by a bracket 60. Rod 54 also has a second upper end (not numbered) having a T-shaped handle 62 which is slidably attached to horizontal cross support 26 by a bracket 64, as shown in FIG. 1.

To lift first sub-assembly 32 and simultaneously engage and lift second sub-assembly 46, the operator pulls up on handle 62 of rod 54 which slides through bracket 64, pulling first sub-assembly 32 and second sub-assembly 46 upwardly.

Apparatus 10 also includes pressure equalization means 66 having a coil spring 68 mounted about rod 54 and cooperating therewith so that uniform pressure is maintained on pressure roller 36 regardless of the position of handle 24 as apparatus 10 is operated. This allows for discrepancies in operator height without affecting the quality of the weld.

As illustrated in FIGS. 1 through 3, alignment control means 16 includes an alignment wheel 70 for contacting and urging the overlapping edge section 20 to move in a direction which enables an operator of the apparatus to maintain the edges of the overlapping edge sections substantially parallel to each other.

Alignment control means 16 also includes an arm 72 whose first end 74 is axially attached to wheel 70. Arm 72's second end 76 is pivotally attached by a bracket 78 to main axle 28 to facilitate lifting of alignment wheel 70 off the surface of the overlapping edge section 20, giving the operator further control over the alignment of the overlapping edge section 20. Bracket 78 is kept from sliding laterally on the axle 28 by collar means 80.

Alignment control means 16 also includes a lift rod 82 (shown in dotted line in FIG. 1) which is pivotally attached to first end 74 of arm 72 to facilitate lifting of wheel 70 off the surface of the overlapping section 20 when the alignment of the overlapping section is as desired. Lift rod 82 also facilitates lowering of wheel 70 onto the surface of the overlapping section 20 to urge it into a proper alignment. The upper end (not numbered) of lift rod 82 is not rigidly attached to the frame, but is capable of being hooked to the frame via a hook 84.

As seen best in FIGS. 1 and 3, alignment wheel 70 contacts the overlapping edge section or overlying section of material to be welded at a pro-determined steering angle A and cant angle which facilitates urging or movement of the overlapping sheet in a direction enabling the operator to keep the sheets aligned as desired. The predetermined angles will vary depending on the thickness, texture, and type of material being welded. Means for adjusting the steering angle and cant angle may also be provided which is represented by a dotted box 86 in FIG. 3. Alignment means 16 may also include means for motorized rotation of wheel 70 as also represented by dotted box 86, so that at steering angles between 45 and 90degrees alignment wheel 70 will pull the overlapping edge section directly towards the overlapped section which is desirable in certain applications. The cant angle is not identified but can be visualized from FIG. 1 as the angle at which the wheel is laterally tilted from a vertical upright position.

While not shown in detail, heating body 14 has generally parallel top and bottom surfaces and at least one rounded side extending between the top and bottom surfaces for facilitating movement of the overlapping material being welded over heating body 14 and the overlapped material under heating body 14. Although in many applications the materials being welded will need to contact the heating body 14 to get hot enough to assure a strong weld, there are other applications where actual contact is not desired due to the thickness, texture, or type of material being welded. To control the temperature of the heating body 14, electric temperature control means 88 such as that disclosed in U.S. Pat. No. 4,894,112 which is hereby incorporated by reference may be employed.

In using apparatus 10 to weld the overlapping sections 20, 22 of heat sealable materials together, the sections are positioned so that they are initially aligned as desired. The operator then pulls upwardly on lift arm means 50 to raise subassembly 32 and second subassembly 46. The operator then positions heating body 14 between the overlapping materials. Once the heating body 14 is positioned as desired, lift arm means 50 is released so that first subassembly 32 and second subassembly 46 are lowered. Guide roller 34 is then swung onto the overlapping section 18 which guides section 18 over the heating body 14. Pressure roller 36 is also in contact with overlapping section 18 at this point so that it is capable of pressing the overlapping sections together after they are heated to weld them together.

Once electric temperature control means 88 is set as desired and heating body is heating at the desired temperature, apparatus 10 is moved forward, i.e., towards guide roller 34, at a speed which adequately heats the material but which is also fast enough to prevent overheating. The speed, of course, will vary depending on the thickness, texture, and type of material being welded.

As apparatus is moved forward, the overlapping edge section (which has a tendency to move away from the heating body 14 and out of alignment) is urged towards the heating body 14 by lowering or engaging alignment wheel 70 so that it contacts the surface of the overlapping edge section 20, thereby pulling it towards the heating body 14 as apparatus 10 moves forward to keep the edges of the overlapping sections substantially parallel. When the overlapping section 18 is properly aligned with overlapped section 22 the operator disengages the wheel 70 by lifting lift rod 82 which pulls wheel 70 off the surface of the overlapping section 20. This procedure is repeated as needed to keep the overlapping section aligned as apparatus 10 is moved forward.

The properly aligned overlapping section 20 is then guided by guide roller 34 over heating body 14, which heats the overlapping section as well as the overlapped section 22 positioned below the heating body 14. As apparatus 10 continues its forward movement, the heated sections exit heating body 14 and are then pressed together by pressure roller 36 so that they are welded together.

The invention and method has been described in detail with reference to particular embodiments thereof, but it will be understood that various other modifications can be effected within the spirit and scope of this invention.

What is claimed is:

1. An apparatus for welding a section of heat sealable sheet to an underlying section of heat sealable sheet, said apparatus comprising:

a frame;

a heating body attached to said frame for being positioned between overlying and underlying sections of heat sealable sheets to heat the sections as said apparatus and sections move relative to each other;

alignment control means attached to said frame for controlling the lateral position of the section of heat sealable sheet material which has a tendency to move laterally as said apparatus and sections move relative to each other so as to maintain the overlying and underlying sections of heat sealable sheet material aligned with each other as said apparatus and the sections move relative to each other; and pressure means attached to said frame for pressing the heated sections together to thermally weld the sections together.

2. An apparatus for welding overlapping edge sections of heat sealable sheet material together, said apparatus comprising:

a frame;

a heating body attached to said frame for being positioned between overlapping edge sections of heat sealable sheet material to heat the edge sections as said apparatus and edge sections move relative to each other;

alignment control means attached to said frame for controlling the lateral position of the overlapping edge section which has a tendency to move laterally as said apparatus and edge sections move relative to each other so as to maintain the edges of the overlapping edge sections substantially parallel to each other as said apparatus and edge sections move relative to each other;

pressure means attached to said frame for pressing the heated edge sections together to thermally weld the edge sections together.

3. An apparatus as claimed in claim 2 wherein said frame includes:

a rigid, U-shaped member in which the closed end of the U-shaped member serves as a handle enabling the operator of the apparatus to hold and move the apparatus;

a horizontal central cross-support for supporting said U-shaped member, said cross-support being rigidly attached to said U-shaped member and parallel to said closed end of said member;

an axle means positioned between the open ends of said frame; and wheels attached to said axle for facilitating propulsion of apparatus.

4. An apparatus as claimed in claim 2 further comprising means for controlling the temperature of said heating body.

5. An apparatus as claimed in claim 2 wherein said alignment control means includes an alignment wheel for contacting and urging the overlapping edge section to move in a direction which enables an operator of the apparatus to maintain the edges of the overlapping edge sections substantially parallel to each other.

6. An apparatus as claimed in claim 3 wherein said axle means includes an axle and said alignment means further includes an arm having a first end axially attached to said wheel and an opposite second end pivotally attached to said axle, said second end being pivotally attached to said axle to facilitate lifting of the alignment wheel off the surface of the overlapping edge section, said alignment means further including collar means mounted on said axle for preventing said second end of said arm from sliding on said axle.

7. An apparatus as claimed in claim 6 further comprising a lift rod pivotally attached to said first end of said arm for lifting said alignment wheel off the surface of the overlapping edge section when the edges of the overlapping sections are parallel to each other and thereby aligned with each other and for lowering said alignment wheel onto the surface of the overlapping edge section when the edges of the overlapping edge sections are out of alignment with each other.

8. An apparatus as claimed in claim 5 wherein said alignment wheel contacts the overlapping edge section at a pre-determined angle which urges the overlapping edge section in a direction which helps maintain the edges of the overlapping edge sections substantially parallel to each other.

9. An apparatus as claimed in claim 8 wherein the angle is a steering angle ranging from 0 to 90 degrees.

10. An apparatus as claimed in claim 9 wherein said steering angle ranges from 0 to 45 degrees.

11. An apparatus as claimed in claim 8 wherein the angle is a cant angle ranging from 0 to 45 degrees.

12. An apparatus as claimed in claim 11 wherein the cant angle ranges from 0 to 30 degrees.

13. An apparatus as claimed in claim 5 wherein said alignment wheel includes means for motorized rotation so that at steering angles between 45 and 90 degrees said wheel pulls the overlapping edge section in a direction which helps to maintain the edges of the overlapping edge sections substantially parallel to each other.

14. An apparatus as claimed in claim 5 wherein said alignment wheel has a rubber tire with tread for enhancing the wheel's ability to urge the overlapping edge section of sheet material in a desired direction.

15. An apparatus as claimed in claim 2 wherein said pressure means includes a pressure roller.

16. An apparatus as claimed in claim 2 further comprising guide means for guiding the overlapping edge section over said heating body.

17. An apparatus as claimed in claim 16 wherein said guide means includes a guide roller for guiding the overlapping edge section over said heating body and wherein said pressure means includes a pressure roller.

18. An apparatus as claimed in claim 17 wherein said frame includes:
   a pivotable first subframe assembly for supporting said pressure and said guide rollers, said first assembly being pivotally attached to said frame's axle;
   a pivotable second subframe assembly for supporting said heating body, said second assembly also being pivotally attached to said frame's axle and including means for engaging said first subassembly as said first subassembly is lifted; and
   lift arm means attached to said first subframe assembly for lifting said first and second subframe assemblies to a raised loading position which facilitates positioning of the heating body between the overlapping edge sections and positioning of the pressure and guide rollers on the exposed surface of the overlapping edge section.

19. An apparatus as claimed in claim 18 wherein said first subframe assembly includes:
   a U-shaped bar; and
   attachment means for pivotally attaching the free ends of said bar to said axle;
   collar means for preventing said U-shaped bar from sliding on said axle;
   support extensions attached to the closed end of said U-shaped bar and projecting outwardly therefrom for supporting said pressure roller about its axle;
   a cross support axle extending between said free ends of said U-shaped bar:
   extension bars pivotally attached at a first end thereof to said cross support axle for supporting said guide roller about its axle at a second end of said extension bars, said extension bars being pivotally attached to said cross support axle so that said guide roller can be swung upwardly to a raised position which facilitates loading of the overlapping edge sections into said apparatus.

20. An apparatus as claimed in claim 3 further comprising pressure equalization means for applying uniform pressure on said pressure means as said handle of said apparatus is moved between upper and lower operating positions so that said pressure means exerts uniform pressure on the overlapping edge section as said apparatus and edge sections move relative to each other.

21. An apparatus as claimed in claim 18 further comprising pressure equalization means for applying uniform pressure on said pressure means as said handle of said apparatus is moved between upper and lower operating positions so that said pressure means exerts uniform pressure on the overlapping edge section as said apparatus and edge sections move relative to each other wherein said pressure equalization means includes a coil spring mounted about said lift arm means and cooperating therewith to apply uniform pressure on said first subframe assembly which in turn applies uniform pressure to said pressure roller.

22. An apparatus as claimed in claim 2 wherein said heating body has generally parallel top and bottom surfaces and at least one rounded side extending between said top and bottom surfaces, said rounded side being sized and configured to facilitate movement of the edge sections over the heating body as said apparatus and edge sections move relative to each other.

23. A method for welding a section of heat sealable sheet to an underlying section of heat sealable sheet, said method comprising the steps of:
   providing overlying and underlying sections of heat sealable sheet material and positioning them so that they are aligned as desired;
   providing a welding apparatus having a heating body for being positioned between the overlying and underlying sections of heat sealable sheet material so that the heating body heats the sections as the apparatus and sections move relative to each other;
   positioning the heating body of the apparatus between the overlying and underlying sections of heat sealable material;
   heating the overlying and underlying sections with the heating body as the apparatus and sections move relative to each other;
   controlling the alignment of the overlying and underlying sections of heat sealable sheet material as said apparatus and the sections move relative to each other by maintaining the lateral position of the section of heat sealable sheet material which has a tendency to move laterally as said apparatus and sections move relative to each other; and
   pressing the heated sections together to weld them together.

24. A method as claimed in claim 23 wherein the position of the section of heat sealable sheet material which has a tendency to move laterally as said apparatus and sections move relative to each other is maintained by urging said section in a direction which maintains the overlying and underlying sections aligned as desired.

25. A method as claimed in claim 24 wherein said urging is done intermittently on an as needed basis to maintain the overlying and underlying sections aligned as desired.

* * * * *